United States Patent

Tsukamoto et al.

[11] Patent Number: 5,935,041
[45] Date of Patent: Aug. 10, 1999

[54] AUTOMATIC TRANSMISSION WITH ANTI-ROLLBACK BAND BRAKE PRESSURE CONTROL

[75] Inventors: Kazumasa Tsukamoto; Masahiro Hayabuchi; Satoru Kasuya; Takayuki Hisano; Atsuki Ikeda, all of Aichi-ken, Japan

[73] Assignee: Aisin AW Co., Ltd., Anjo, Japan

[21] Appl. No.: 08/942,204

[22] Filed: Oct. 1, 1997

[30] Foreign Application Priority Data

Oct. 23, 1996 [JP] Japan .................................. 8-297904

[51] Int. Cl.⁶ .................................................. F16H 61/00
[52] U.S. Cl. .............................................. 477/92; 477/195
[58] Field of Search ............................ 477/92, 93, 118, 477/189, 194, 195, 156; 137/259

[56] References Cited

U.S. PATENT DOCUMENTS

| | | |
|---|---|---|
| 4,648,289 | 3/1987 | Kubo et al. . |
| 4,941,096 | 7/1990 | Ito et al. . |
| 5,020,393 | 6/1991 | Kuwayama et al. . |
| 5,522,779 | 6/1996 | Tabata et al. ..................... 477/152 X |
| 5,692,990 | 12/1997 | Tsukamoto et al. ................. 477/93 |

*Primary Examiner*—Khoi Q. Ta

*Attorney, Agent, or Firm*—Oliff & Berridge, PLC

[57] ABSTRACT

A control system for a vehicular automatic transmission includes a speed change mechanism including an output element that is connected to the drive shaft of a vehicle to transmit power, and a rotary element connected to the output element. A control system for the speed change mechanism is also provided. The control system includes a hydraulic servo actuated brake for retaining the rotary element to check the rotation of the output element in a vehicle roll back direction. The brake includes a band brake that establishes different application forces depending on whether the brake operates by a self-energizing action or a de-energizing action according to the rotational direction of the rotary element. The band brake is set so that the rotary element rotates during backward rotation of the output element in the direction of the self-energizing action, and is set with a first oil pressure necessary for retaining the rotary element during backward rotation of the output element caused by the roll back of the vehicle. The first oil pressure is lower than a second oil pressure necessary for retaining the rotary element during operation of the band brake by the de-energizing action. The control system further includes an oil pressure feeder for feeding the hydraulic servo of the band brake with an oil pressure which is equal to or higher than the first oil pressure and lower than the second oil pressure.

6 Claims, 9 Drawing Sheets

|  | C-1 | C-2 | B-1 | B-2 | B-3 | B-R |
|---|---|---|---|---|---|---|
| P |  |  |  |  |  |  |
| REV | ○ |  |  |  |  | ○ |
| N |  |  |  |  |  |  |
| 1ST | ○ |  |  |  | ○ |  |
| 2ND |  | ○ |  |  | ○ |  |
| 3RD | ○ | ○ |  |  | (○) |  |
| 4TH |  | ○ | ○ |  |  |  |
| 5TH |  | ○ |  | ○ |  |  |

FIG.3

|  |  | Clutch | | | Brake | | | | One-Way Clutch | | |
|---|---|---|---|---|---|---|---|---|---|---|---|
|  |  | C1 | C2 | C3 | B1 | B2 | B3 | B4 | F1 | F2 | F3 |
|  | R | × | ○ | × | × | × | ○ | ○ | × | × | × |
|  | N | × | × | × | × | × | × | ○ | × | × | × |
| D | 1ST | ○ | × | × | × | × | (○) | ○ | × | ○ | ○ |
|  | 2ND | ○ | × | × | ○ | ○ | × | ○ | ○ | × | ○ |
|  | 3RD | ○ | × | ○ | ○ | ○ | × | × | ○ | × | × |
|  | 4TH | ○ | ○ | ○ | × | ○ | × | × | × | × | × |

AUTOMATIC TRANSMISSION WITH ANTI-ROLLBACK BAND BRAKE PRESSURE CONTROL

BACKGROUND OF THE INVENTION

1. Field of the Invention

The invention relates to a control system for a vehicular automatic transmission and, more particularly, to a technique for controlling the automatic transmission so as to prevent the roll back (or retreating or reverse) of the vehicle at the start in a high speed stage on a snow-covered road and to effect the hill hold under a neutral control.

2. Related Art

When the vehicle is to be started on a low-$\mu$ road such as a snow-covered road by shifting the transmission to the lowest speed stage (i.e., the first speed), the drive force may become excessively high in relationship to the frictional force between the wheels and the road surface, thus causing wheel spin and making a smooth vehicle start impossible. A conventional automatic transmission is known that employs a technique enabling the vehicle to be started at a higher speed stage, such as in second or higher speed, in which the torque amplification in the transmission is smaller than that at the lowest speed stage, for starting the vehicle on a snow-covered road, as disclosed in U.S. Pat. No. 4,941,096.

In order to reduce the fuel cost during the running time of the vehicle, when the vehicle is stopped with the running range of the automatic transmission being selected, the engine load is lowered by causing the input clutch of a speed change mechanism, as ordinarily kept in the applied state, to stand by in the released state just before being applied, to reduce the dragging of the fluid in the torque converter. This is called the "neutral control". In order to prevent the vehicle from rolling back on a slope, as might otherwise occur because the creep force is eliminated by the neutral control, there is a technique which performs the hill hold by locking the speed change mechanism, as disclosed in U.S. Pat. No. 4,648,289.

When the control of the start at a high speed stage, as disclosed in U.S. Pat. No. 4,941,096, is made, the creep force may be small for the start on the low $\mu$ road such as the snow-covered road in relation to the slope gradient, and the vehicle may roll back simultaneously as the brake pedal is released. In this case, the drive force may become excessive and cause slippage of the wheels, thereby making a smooth start impossible if the driver depresses the accelerator pedal too quickly. A device could be provided for fixing the output shaft of the transmission, for example. However, it would be necessary to control the device such that the device is actuated only when the vehicle may possibly roll back and is quickly released simultaneously with the start. This raises a problem that the timing control is difficult.

In the hill hold control during the neutral control, as disclosed in U.S. Pat. No. 4,648,289, a frictional engagement element to be applied at the time of establishing the second speed of the speed change mechanism is used and applied in the neutral state. As a result, the speed change mechanism assumes the second speed configuration at the hill hold time so that a shift shock from the second speed to the first speed occurs when the release of the frictional engagement element is delayed. The problem of this case is that the timing control is also difficult.

SUMMARY OF THE INVENTION

A first object of the invention is to provide a control system for a vehicular automatic transmission, which can prevent a stopped vehicle from rolling back without the need for any complicated control and can release the roll back preventing function quickly at the start.

A second object of the invention is to achieve the retraction preventing function not by adding any special mechanism to the speed change mechanism but by using the brake which is mounted for the intrinsic speed change in the speed change mechanism.

A third object of the invention is to establish the roll back preventing function even when the vehicle is started at a high speed stage on a slope such as a snow-covered road, thereby making a smooth start of the vehicle possible.

Generally, a brake for establishing a speed reduced stage in the speed change mechanism is required during a drive time of the vehicle to prevent the backward rotation of the rotary element acting as a reaction element in the speed change mechanism. The reaction torque in that case is increased by amplification of the speed reduction. When the brake is a band brake having a rotational direction component to its application force, it is advantageous for achieving the full torque capacity that the direction in which the band brake has self-energizing action and thus a higher application force is set in the backward rotational direction, which is the same direction as the reaction torque. If the higher speed stage for a higher speed stage start is a directly connected one, the rotary element for locking the speed change mechanism will always rotate backward when the vehicle rolls back. Therefore, a fourth object of the invention is to achieve the roll back preventing function by using the band brake for the speed reduced stage as the roll back preventing brake but without changing the characteristics of the existing band brake.

A fifth object of the invention is to prevent the shift shock, as might otherwise be caused by a delay in releasing the brake which is applied for the hill hold in the hill hold control during the neutral control. The brake for retaining the rotary element acting as the reaction element for achieving the so-called "engine braking effect" when the wheels are driven in the speed reduced stage of the speed change mechanism retains the forward rotation of the rotary element. When the brake is a band brake having a rotational direction component to its application force, it is advantageous for retaining the application force that the forward rotation is in the direction of the self-energizing action. When the one-way clutch is locked to check the backward rotation of the output shaft, the reaction torque in the forward rotational direction is applied to the rotary element for supporting that reaction. Therefore, the band brake for retaining the reaction torque may be set to have self-energizing action on the side of the rotational direction component of its application force, which in this case is in a forward rotational direction. Therefore, a sixth object of the invention is to achieve the hill hold function without changing the characteristics of the existing band brake by using the brake that is applied during a non-drive time as the hill hold brake.

In order to achieve the above-specified objects, according to the invention, there is provided a control system for a vehicular automatic transmission comprising: a speed change mechanism including an output element connected to the drive shaft of a vehicle in order to transmit power, and a first rotary element connected to the output element; and a control system for the speed change mechanism, wherein the improvement comprises a hydraulic servo actuated brake for retaining the first rotary element relative to the transmission casing to check the rotation of the output element in a vehicle roll back, wherein the brake includes a band brake that establishes different application forces depending on whether the brake operates by a self-energizing action or a deenergizing action according to the rotational direction of the first rotary element. The band brake is set so that the first rotary element rotates during backward rotation of the output element in the direction of the self-energizing action of the band brake. The band brake is set with a first oil pressure necessary for retaining the first rotary element during backward rotation of the output element caused by the roll back of the vehicle. The first oil pressure is lower than a second oil pressure necessary for retaining the first rotary element during operation of the band brake by de-energizing action. The control system further comprises oil pressure feeding means for feeding the hydraulic servo of the band brake with an oil pressure which is equal to or higher than the first oil pressure and lower than the second oil pressure.

In order to achieve the second object, the band brake is a brake to be applied for establishing a predetermined gear stage by the speed change mechanism.

In order to achieve the third object, an embodiment of the invention further includes: high speed stage start selecting means for selecting a start in a high speed stage of the speed change mechanism; and stop detecting means for detecting the stop state of the vehicle, and the control system sets the speed change mechanism to a high speed stage when the vehicle is in the stop state, and causes the oil pressure feeding means to feed the hydraulic servo of the band brake with an oil pressure equal to or higher than the first oil pressure and lower than the second oil pressure.

In order to achieve the fourth object, the band brake is a brake to be applied for establishing a speed reduced stage of the speed change mechanism, and the high speed stage is a directly connected stage to be established by the speed change mechanism.

In order to achieve the fifth object, an embodiment of the invention further includes: an input clutch for inputting the drive force from the power source of the vehicle to the speed change mechanism; accelerator operation detecting means for detecting the accelerator pedal operation of the vehicle; brake operation detecting means for detecting the brake pedal operation; and stop detecting means for detecting the stop state. The control system releases the input clutch when the accelerator pedal is released, when in the vehicle stop state and the accelerator pedal is released, and the brake pedal is depressed with the vehicle speed being substantially equal to 0, and causes the oil pressure feeding means to feed the hydraulic servo of the band brake with an oil pressure equal to or higher than the first oil pressure and lower than the second oil pressure.

In order to achieve the sixth object, the speed change mechanism includes: a second rotary element connected to the output element; a first one-way clutch for checking the forward rotation of the second rotary element; and a second one-way clutch for checking the forward rotation of the first rotary element. The band brake is a brake connected to the first rotary element in parallel with the second one-way clutch and associated with the retention of the backward rotation of the second rotary element by the locking action of the first one-way clutch and the retention of the forward rotation of the first rotary element, for checking the backward rotation of the output element of the speed change mechanism, and for retaining the first rotary element during a non-drive time of the speed change mechanism, in which the second one-way clutch rotates idly.

According to an embodiment of the invention, when a rotary element is to be retained by a band brake, a higher oil pressure is required to apply the band brake in a rotational direction that includes deenergizing action than the oil pressure required to apply the self-energizing action. By making use of this characteristic of the band brake, the direction of the self-energizing action can be set to coincide with the direction of rotation of the rotary element at the roll back time to provide the region in which the first oil pressure necessary for retaining the rotary element at the roll back time is lower than the second oil pressure necessary for retaining the rotary element at the forward time. As a result, when the hydraulic servo for fastening the band brake is fed with an oil pressure lower than the second oil pressure and equal to or higher than the first oil pressure, the roll back of the vehicle is prevented by the self-energizing action of the band brake. At the forward run, the action of the band brake is replaced by the de-energizing action so that the apply force of the band brake is too small to retain the rotary element. As a result, it is possible to effect the start which is substantially similar to that which is obtained when the band brake is released. Even when the release of the brake is delayed, the vehicle roll back preventing function by the brake can be released by the forward run of the vehicle to ensure the smooth start without any complicated brake control.

According to an embodiment of the invention, the roll back preventing function can be achieved by the same band brake that is disposed for the speed change in the speed change mechanism, so that the desired object can be achieved without adding any special mechanism.

According to another embodiment of the invention, the roll back preventing function can be achieved even when the vehicle starts at a high speed stage on a slope such as a snow-covered road, to effect the smooth start of the vehicle.

According to still another embodiment of the invention, the high speed stage for the start is established with a direct connection between the output element and the rotary element so that the direction of the reaction torque to be applied to the rotary element at the time of achieving the speed reduced stage can be made identical to that of supporting the reaction torque for preventing the vehicle roll back. As a result, the roll back preventing function can be achieved by using the speed reduced stage achieving band brake as it is but without changing the characteristics of the existing band brake.

According to yet another embodiment, it is possible to prevent the shift shock which might otherwise be caused at the start from the hill hold state under the neutral control by the transient shift state due to the delay in the release of the band brake to be applied at a time of establishing a predetermined gear stage.

According to another embodiment, the brake to be applied at the non-drive time at a gear stage at the reduced speed side retains the forward rotation at the non-drive time so that the self-energizing action may be established at the forward rotation side. Moreover, the brake for checking the backward rotation of the output shaft by locking the one-way clutch retains the forward rotation side so that the self-energizing action may be set at the forward rotation side. As a result, the hill hold can be established by using the brake to be applied at the non-drive time without changing the characteristics of the existing band brake.

BRIEF DESCRIPTION OF THE DRAWINGS

FIG. 3 is an operation diagram of the automatic transmission;

DESCRIPTION OF THE PREFERRED EMBODIMENTS

Figure 1:
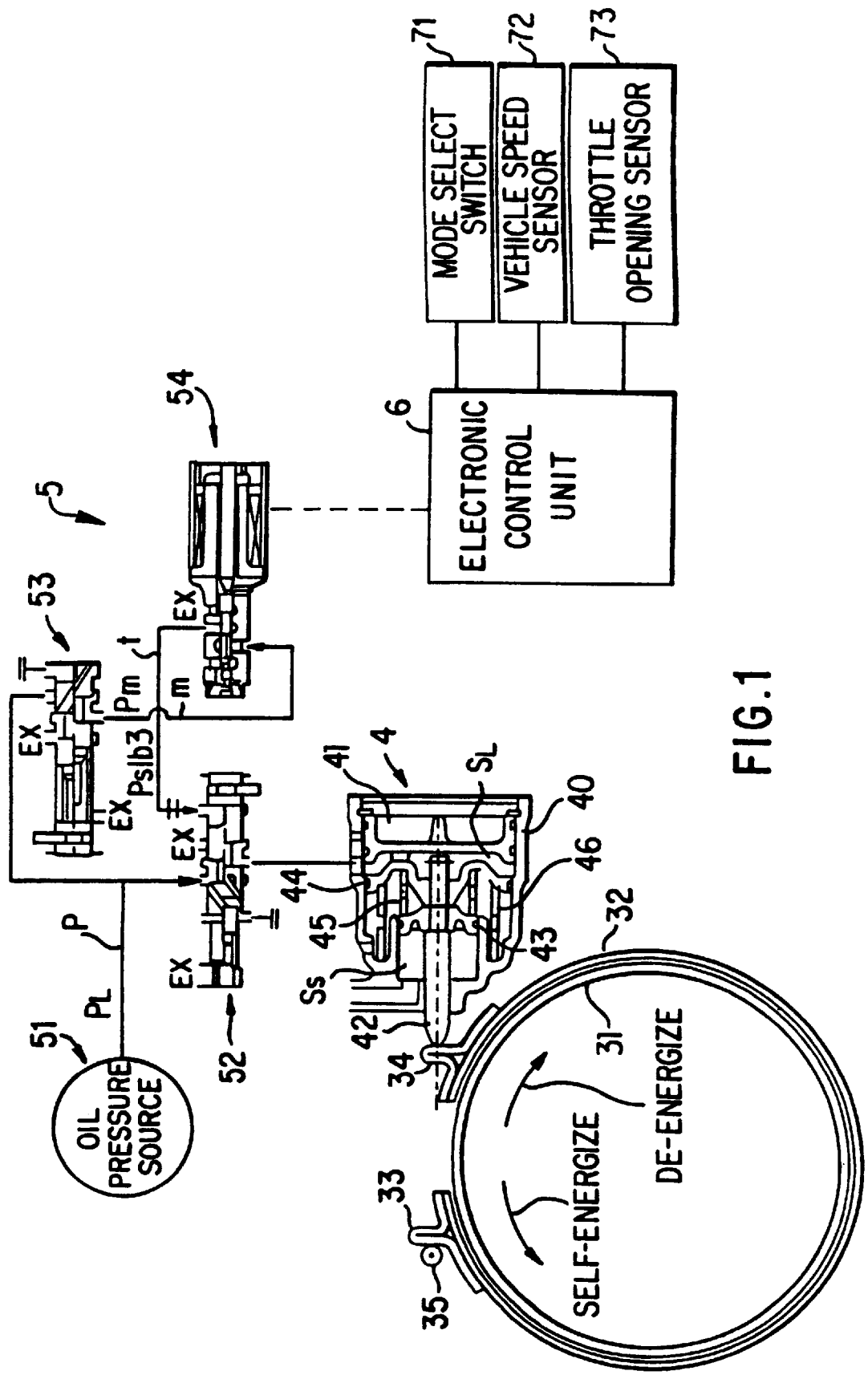
FIG. 1 is a system structure diagram showing the hydraulic circuit and blocks of a control system for a vehicular automatic transmission according to a first embodiment of the invention.

The invention will be described in connection with its embodiments with reference to the accompanying drawings. In a first embodiment of FIGS. 1 to 6, the invention is embodied as a power transfer unit having a transverse structure by combining an automatic transmission with a differential unit, as shown in FIG. 2. The schematic structure of the mechanism will be described at first. The transfer unit includes: an automatic transmission including a torque converter 12 having a lockup clutch 11 connected to the engine of a vehicle, and a speed change mechanism M having three stages of planetary gear sets M1, M2 and M3 for changing the speed of the shift of the torque converter 12 into five forward and one reverse speeds; and a differential unit 21 connected to the automatic transmission through a counter gear unit 20 acting as a speed reducing mechanism for transmitting the output of the automatic transmission, to the left and right wheels of the vehicle. In the two gear sets M1 and M2 of the automatic transmission, pinion gears $P_1$ and $P_2$ having larger and smaller diameters are connected directly to each other. Ring gear $R_1$ is connected to carrier $C_3$ and ring gear $R_3$ is connected to carrier $C_1$ of the two gear sets M1 and M3. The sun gear $S_1$ and carrier $C_1$ of the gear set M1 are connected to an input shaft 14 connected with turbine shaft 13 of the torque converter 12 through input clutches C-1 and C-2, respectively, so that they may be input elements. The ring gear $R_1$ and the carrier $C_3$ are connected to each other, and are connected to a counter drive gear 19 acting as an output element. The sun gear $S_1$ of the gear set M1 can be retained relative to a transmission case 10 by a brake (B-1); the sun gear $S_2$ of the gear set M2 can be retained relative to the transmission case 10 by a brake (B-2); the sun gear $S_3$ of the gear set M3 can be retained relative to the transmission case 10 by a brake (B-3); and the ring gear $R_3$, as connected to the carrier $C_1$, can be retained relative to the transmission case 10 by a brake (B-R). More specifically: the sun gear $S_1$ is connected to the input clutch (C-1) through a sun gear shaft 16 fitted on the outer circumference of the input shaft 14; the carrier $C_1$ is connected to the input clutch (C-2) through a carrier shaft 17 fitted on the outer circumference of the input shaft 14; and the sun gear $S_3$ is connected to the brake (B-3) through a sun gear shaft 18 fitted on the outer circumference of the carrier shaft 17. The individual brakes are made of band brakes, excepting the brake (B-R) which is made of a multi-disc brake. The counter drive gear 19 acting as the output element is connected through the counter gear unit 20 and the differential unit 21 to the drive shaft of the vehicle.

Figure 3:
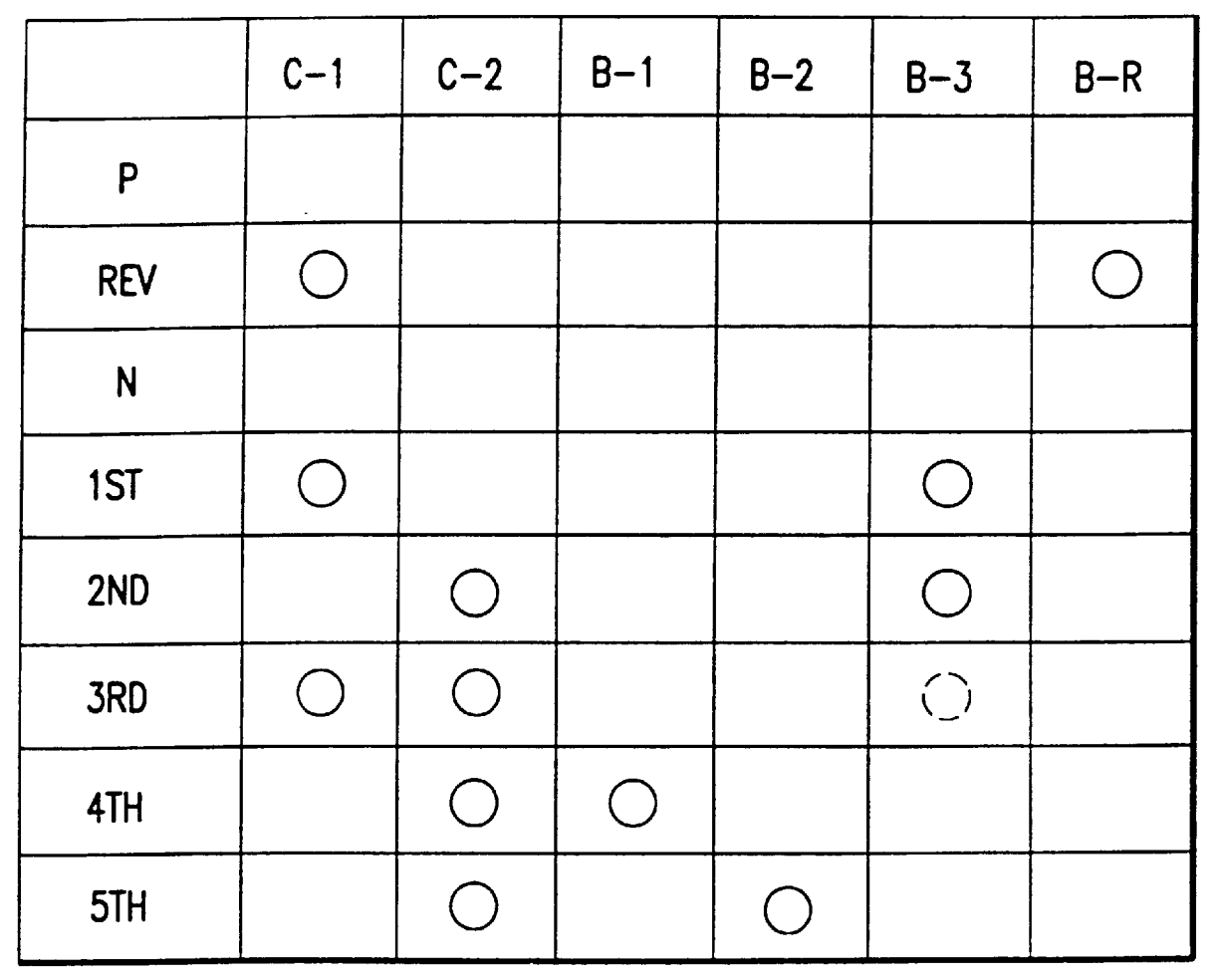

The automatic transmission thus structured establishes the individual gear stages under the control of an electronic control unit and a hydraulic control unit, as will be described with reference to FIG. 1, by feeding the oil pressure to the hydraulic servos corresponding to the aforementioned individual clutches and brakes to apply (as indicated by symbols O) and release (as indicated by blanks) the individual clutches and brakes, as tabulated in FIG. 3. A broken circle in FIG. 3 indicates the application of brake B-3 for preventing the vehicle roll back in a snow mode, as will be described in detail.

Specifically, the first speed (1ST) is established by applying the input clutch (C-1) and the brake (B-3). At this time, the drive torque, as directed by a solid arrow in FIG. 2, is inputted from the input shaft 14 through the clutch (C-1) to the sun gear $S_1$ and is outputted as the rotation of the carrier $C_3$, as decelerated the most by the retention of the sun gear $S_3$ caused by the application of the brake (B-3), in the same direction to the counter drive gear 19. Likewise, the second speed (2ND) is established by applying the input clutch (C-2) and the brake (B-3). At this time, the input, as fed through the clutch (C-2) to the brake (B-3), is fed as it is through the carrier $C_1$ to the ring gear $R_3$ and is outputted as the differential rotation of the carrier $C_3$, using the sun gear $S_3$ retained by the application of the brake (B-3), to the counter drive gear 19. Thus, the brake (B-3) absorbs the reaction torque to be applied in the direction indicated by a broken arrow to the sun gear $S_3$ at the speed reduction stage, at which the input torque is amplified by the speed change mechanism M, so that it is given a torque capacity sufficient for the absorption. Next, the third speed (3RD) is established through the direct connection of the first planetary gear set M1 by the simultaneous applications of the two input clutches (C-1, C-2). At this time, the rotation of the input shaft 14 is outputted unchanged as the rotation of the carrier $C_3$ to the counter drive gear 19. At this gear stage, and with the vehicle stopped, when the brake (B-3) is applied, the sun gear $S_3$ is retained to prevent the rotation of the ring gear $R_3$ relative to carrier $C_3$ so that the speed change mechanism M in the direct connection is locked. As a result, the counter drive gear 19 is allowed by the control of the brake (B-3), as will be detailed, to rotate (in the forward direction of the counter drive gear 19) forward of the vehicle, but is inhibited from rotating (in the reverse rotation of the counter drive gear 19, as indicated by the broken arrows) backward of the vehicle.

The fourth speed (4TH) and higher speed belong to an overdrive, and the fourth speed (4TH) is established by applying the input clutch (C-2) and the brake (B-1) for retaining the sun gear $S_1$. At this time, the rotation of the input shaft 14 is transmitted as the rotation of the ring gear $R_1$, as accelerated by the revolution of the pinion gear $P_1$ from that of the carrier $C_1$, through the carrier $C_3$ to the counter drive gear 19. The fifth speed is established by applying the input clutch (C-2) and the brake (B-2). At this time, the rotation of the input shaft 14 is transmitted as the rotation of the ring gear $R_1$, which is further accelerated by the rotation of the pinion gear $P_2$ on its axis with respect to the rotation of the carrier $C_1$, through the carrier $C_3$ to the counter gear 19. In this speed, the diameter of the sun gear $S_2$ is larger than that if the sun gear $S_1$, so that accelerated rotation of the ring gear $R_1$ is more accelerated than that of the fourth speed.

The reverse stage (REV) is established by applying the input clutch (C-1) and the brake (B-R). At this time, the rotation of the carrier $C_1$ is stopped by the retention of the ring gear $R_3$ on the case 10, as effected by applying the brake (B-R), and the rotation of the ring gear $R_1$, the backward rotation of which is decelerated by the revolution of the pinion gear $P_1$, is outputted from the counter drive gear 19 through the carrier $C_3$.

In the automatic transmission thus structured, according to the invention, the brake capable of retaining the rotation of the output element (e.g., the counter drive gear 19 in the present embodiment) in the backward direction of the vehicle is exemplified by the band brake (B-3) for retaining the sun gear $S_3$. The control system for controlling the oil pressure of the hydraulic servo of the brake (B-3) includes, in the present embodiment: the circuit in the hydraulic control unit, as shown in FIG. 1; and a program in an electronic control unit 6 for controlling the circuit with electric signals.

Figure 2:
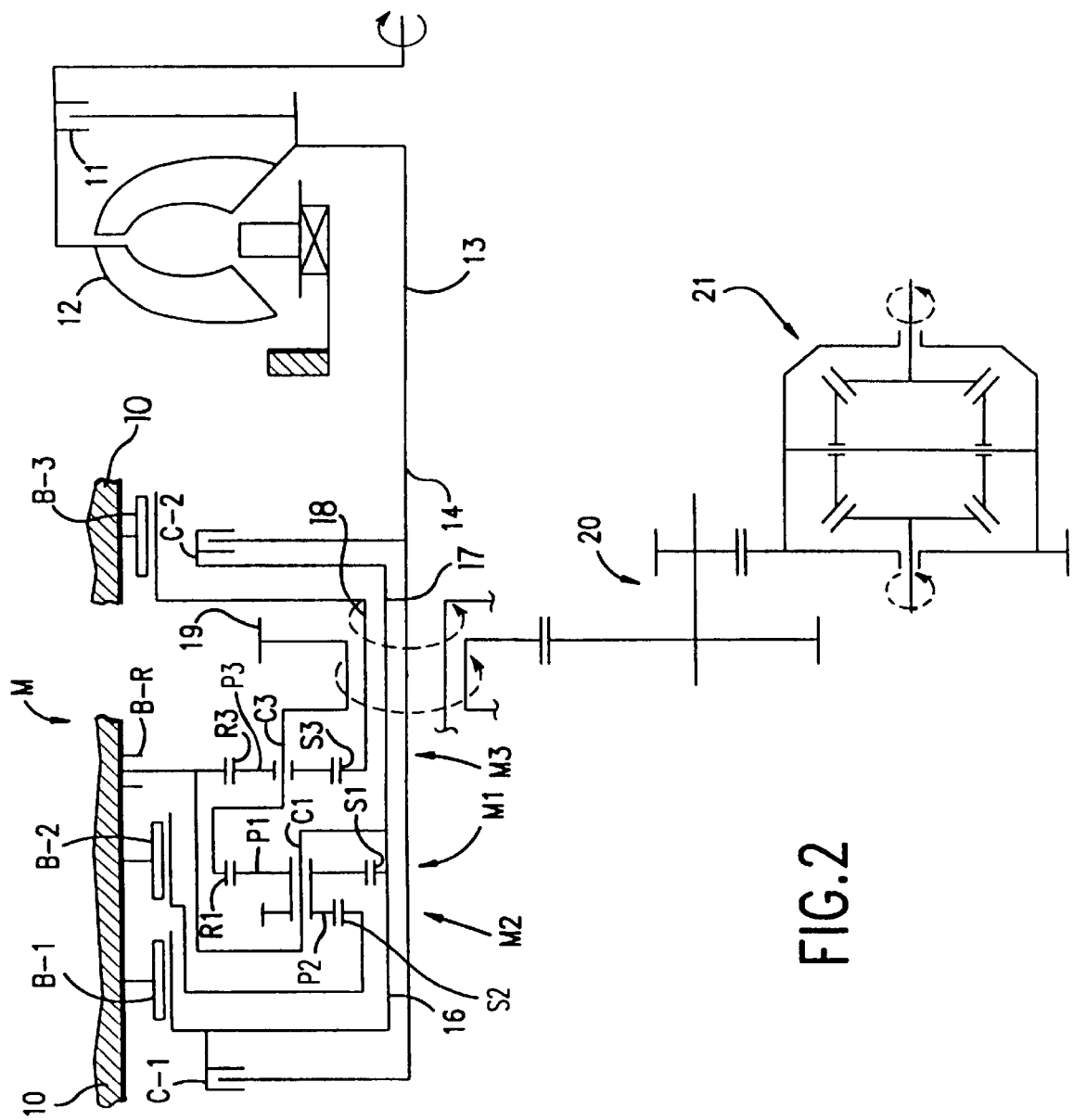
FIG. 2 is a schematic diagram showing a speed change mechanism of the automatic transmission.

As shown in detail in FIG. 1, the band brake (B-3) is composed of a drum 31, a band 32 and a hydraulic servo 4. Of these components, the drum 31 is connected through the sun gear shaft 18 to the sun gear $S_3$ as shown in FIG. 2. The band 32 is equipped with brackets 33 and 34 at both ends of its outer circumference. One bracket 33, as located at the anchor side, is supported in abutment by an anchor pin 35 which is embedded in the case 10, and the bracket 34, as located at the other apply side, is held in abutment against the end of a piston rod 42 of the hydraulic servo 4 by the expanding return elasticity of the band 32.

Thus, in the case of the band brake (B-3) having the mechanism in which one end of the band is fixed while the other end is made movable, when the drum 31 is subjected to a shown torque in the counter-clockwise direction at the time of braking, a frictional force resulting from the engagement between the band 32 and the drum 31 acts in a direction in which the band is fastened by anchor pin 35 to case 10 so that a self-energizing (hereinafter referred to as the "self-energe") action occurs to increase the brake applying force. When the drum 31 receives the torque in the shown clockwise direction, on the other hand, the frictional force resulting from the engagement between the band 32 and the drum 31 acts as a force to loosen the band in the direction opposite to that for fastening the band, so that a de-energizing (as will be referred to as the "de-energe") action occurs to decrease the brake applying force. As a result, the band brake (B-3) establishes a difference in the application force depending upon the direction of the reaction torque to be applied to the sun gear $S_3$.

The hydraulic servo 4 of the brake (B-3) is structured to include: a servo cylinder 40 having cylinder bores $S_L$ and $S_S$ having larger and smaller diameters; a larger-diameter piston 44 fitted slidably in the larger-diameter bore $S_L$; a smaller-diameter piston 43 fitted slidably in the smaller-diameter bore $S_S$; the rod 42 fitted in the two pistons 43 and 44; a separator spring 45 and a return spring 46 of larger and smaller diameter compression coil springs; and a lid 41 shutting the open end of the larger-diameter bore $S_L$. The rod 42, as fixed on the smaller-diameter piston 43, protrudes slidably through the end wall of the servo cylinder 40 at the side of the smaller-diameter bore $S_S$ so as to abut against the bracket 34 of the band 32. The larger-diameter piston 44 is slidably supported by the rod 42, and the smaller-diameter separator spring 45 is arranged under a preset load between the smaller-diameter piston 43 and the larger-diameter piston 44. The larger-diameter return spring 46 is arranged under a preset load between the end wall of the servo cylinder 40 and the larger-diameter piston 44.

A hydraulic control unit 5 for controlling the hydraulic servo 4 is equipped with: an oil pressure source 51 composed mainly of a pump for a line pressure $(P_L)$; a B-3 control valve 52 connected via a line pressure oil line p to the oil pressure servo 51 for regulating and feeding the line pressure $(P_L)$ to the hydraulic servo 4; a solenoid modulator valve 53 also connected to the line pressure oil line p for lowering and outputting the line pressure $(P_L)$ to a modulator pressure oil line m; and a linear solenoid valve 54 for applying a linear solenoid pressure (Ps1b3) via a linear solenoid pressure oil line t to the B-3 control valve 52 on the basis of a modulator pressure (Pm) reduced by the solenoid modulator valve 53.

The electronic control unit 6 for controlling the linear solenoid valve 54 is connected not only with the solenoid of the linear solenoid valve 54 but also with a mode select switch 71 acting as high-speed stage start selecting means, a vehicle speed sensor 72 acting as stop detecting means, and a throttle opening sensor 73. Of these individual sensors: the mode select switch 71 is used for deciding the snow mode; the vehicle speed sensor 72 is used for deciding the stop/non-stop of the vehicle; and the throttle opening sensor 73 is used for selecting a shift map for the ordinary run.

According to the invention, the band brake (B-3) is set to have a region in which the oil pressure necessary for retaining the sun gear $S_3$ is lower at the reverse time, when the counter drive gear 19 is driven backward from the wheel side, than that necessary for retaining the sun gear $S_3$ at the time of establishing the first speed and the second speed.

Figure 5:
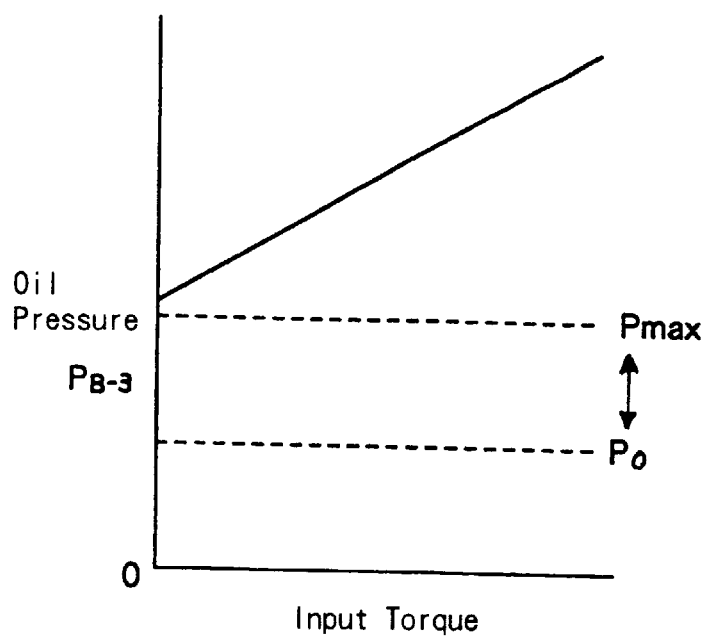
FIG. 5 is a hydraulic characteristic diagram of the retraction preventing control of the automatic transmission.

These settings will be described with reference to FIG. 5. As shown, the oil pressure $(P_{B-3})$ necessary for keeping the engagement of the brake (B-3) at the drive time is characterized to rise linearly with respect to the input torque, as illustrated in FIG. 5. On the other hand, the oil pressure of the brake (B-3) necessary for checking the roll back of the vehicle takes a constant low level relating not to the input torque but to the torque which is transmitted according to the slope gradient from the wheel side to the counter drive gear 19. In this embodiment, therefore, this oil pressure is set on principle to a level $(P_0)$ which can keep the lock state of the speed change mechanism for the slope gradient to be ordinarily estimated, and is raised, if necessary, to a limit level (Pmax) lower than that necessary for the application at the drive time. Thus according to the above-specified settings, the band brake (B-3) is slipped for the forward rotation of the sun gear $S_3$ but not for the backward rotation by feeding an oil pressure of $P_0$ $P_{B-3}$<Pmax to the hydraulic servo of the brake.

Figure 4:
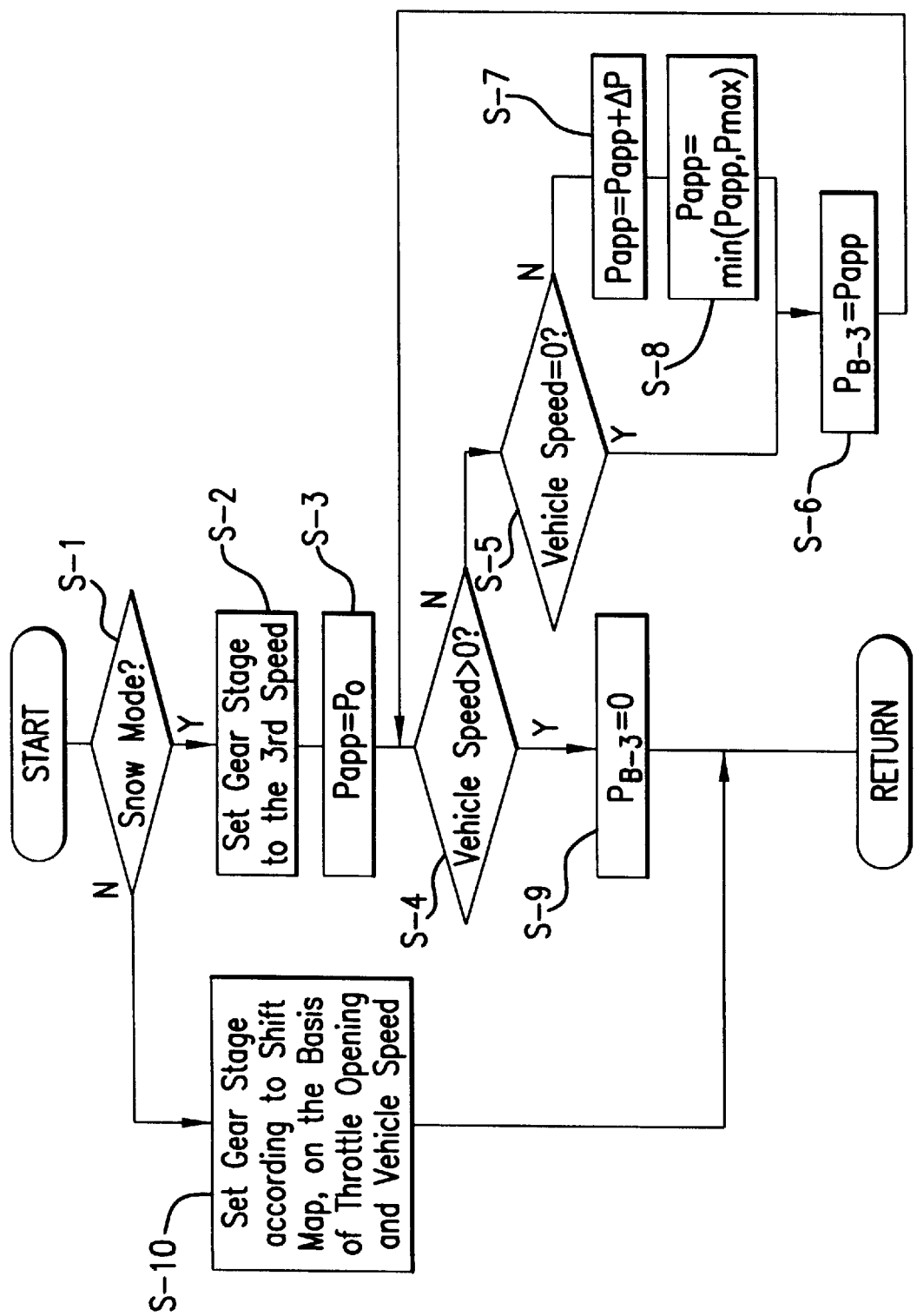
FIG. 4 is a flow chart showing a retraction preventing control of the control system of the automatic transmission.

FIG. 4 is a flow chart of the oil pressure controlling routine in the electronic control unit 6. At first Step S-1, it is decided on the basis of the detected signal of the mode select switch 71 whether the snow mode is selected. When this answer is no (N), the ordinary gear stage is set at Step S-10. Specifically, the gear stage is set according to the shift map, as stored in the electronic control unit 6 on the basis of the throttle opening, as detected by the throttle opening sensor 73, and the vehicle speed, as detected by the vehicle speed sensor 72. When this answer is yes (Y), the gear stage is set at Step S-2 to the third speed for a higher gear stage start. At Step S-3, the predetermined pressure ($P_0$) is read as the apply pressure (Papp), and the routine enters into Step S-4 for deciding the forward vehicle run.

This forward vehicle run decision is made on whether the vehicle speed from the vehicle speed sensor 72 is positive. When the vehicle speed is positive (Y), the feed pressure ($P_{B-3}$) of the hydraulic servo 4 is set to 0 at Step S-9, and the routine is returned. Specifically, the signal for discharging the feed pressure of the hydraulic servo 4 by the pressure regulation of the B-3 control valve 62 is outputted to the linear solenoid valve 54, as shown in FIG. 1. As a result, no oil pressure is fed to the hydraulic servo 4 even when the snow mode is selected during the vehicle run. When the answer of the positive vehicle speed is no (N), the routine enters into the decision of the vehicle speed of Step S-5 in determining whether the vehicle is stopped. When this answer is yes (Y), the vehicle stop state is sufficiently held at the predetermined pressure ($P_0$), as read at Step S-3. Therefore, the feed pressure ($P_{B-3}$) is outputted by using the predetermined pressure ($P_0$) as the apply pressure (Papp), and this loop is repeated. When the answer of the vehicle stop determination of Step S-5 is no (N), the vehicle is rolling back so that the pressure is raised at Step S-7. This increment is $\Delta P$, and the resultant feed pressure ($P_{B-3}$) is outputted at subsequent Step S-6. This loop is repeated till the pressure rise limiting operation by Step S-8 is performed. Here, the upper limit (Pmax) is given a value estimated by allowing for the control error less than the feed oil pressure at the drive time.

As a result of this routine, in the hydraulic circuit shown in FIG. 1, by the pressure regulation of the linear solenoid valve 54, as based on the modulator pressure (Pm), the signal pressure for preventing the roll back of the vehicle in place of the linear solenoid pressure (Ps1b3) at the ordinary shift time is applied to the spool end of the B-3 control valve 52. By the balance between the return spring load against the signal pressure and the feedback pressure, the B-3 control valve 52 regulates the line pressure ($P_L$) to the feed pressure ($P_{B-3}$) so that the regulated apply pressure (Papp) is fed to the larger-diameter bore $S_L$ of the hydraulic servo 4. The movement of the larger-diameter piston 44 by this oil pressure feed results in the rod 42 being pushed out to push the bracket 34 at its leading end so that the band 32, as supported at its one end by the anchor pin 35, is tightened on the drum 31. When the reaction torque to be applied to the drum 31 is in the shown self-energe direction, the rotation of the drum 31 by the reaction torque is prevented. When the reaction torque in this case is in the shown de-energe direction, on the other hand, the rotation of the drum is allowed.

Figure 6:
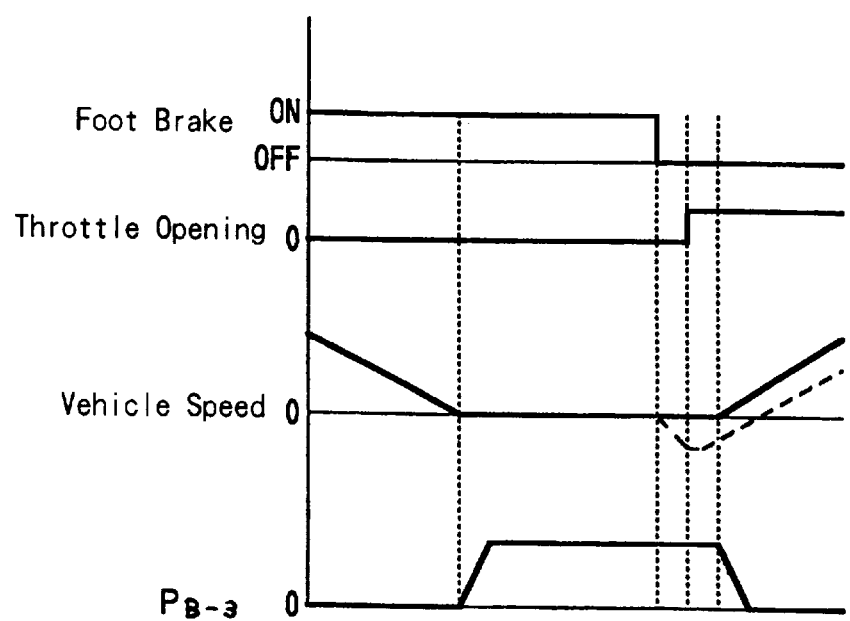
FIG. 6 is a time chart of the retraction preventing control by the control system.

FIG. 6 shows a time chart at the snow mode time. This chart starts from the braking state to the vehicle stop. At first, the throttle opening is 0, and the foot brake is depressed (ON) so that the vehicle speed is in the decelerating state. When the vehicle speed comes to 0 or to the stop state, the feed of the apply pressure to the hydraulic servo of the brake (B-3) is started so that the vehicle comes to roll back preventing state. The creep force may be small in the third speed state because of a steep gradient on an uphill when the vehicle speed comes to 0 or to the stop state, and a negative speed or roll back of the vehicle occurs, as indicated by a broken curve in FIG. 6. However, this vehicular roll back is prevented by the application of the brake (B-3) of the present roll back preventing control so that the vehicle speed is kept at 0. When the throttle is opened in this state by depressing the accelerator pedal, the vehicle is started before long so that the vehicle speed begins to rise, as indicated by a solid curve. By releasing the apply pressure to the hydraulic servo of the brake (B-3) at a proper timing, therefore, the brake (B-3) is returned to the intrinsic released state to lower the oil pressure to 0.

According to the control system of the first embodiment, as has been described in detail, by applying the oil pressure less than the second level (Pmax) but no less than the first level ($P_0$) to the hydraulic servo 4 to fasten the band brake (B-3), the roll back of the vehicle is prevented by the self-energe action. During a forward run, the action is changed into the de-energe action shown in FIG. 1 so that the apply force of the band brake (B-3) becomes too small for retaining the sun gear $S_3$. As a result, the vehicle can be started substantially as if the band brake (B-3) is released. Even with a delay in the release of the brake, therefore, the vehicular roll back preventing function by the brake is released by the forward run of the vehicle so that a smooth start can be achieved without any complicated brake control. Moreover, the roll back preventing function can be achieved by the brake (B-3) provided in the speed change mechanism for the shifting operation, so that the desired purpose can be achieved without adding any special mechanism. The roll back preventing function can also be achieved even when the vehicle is started on an uphill incline and in a high gear stage on a snow-covered road, so that the vehicle can be smoothly started. Since the third speed stage for the start of the vehicle is a directly connected stage such that rotation of output element 19 is the same as rotation of the input shaft 14, the direction of the reaction torque to be applied to the sun gear $S_3$ for establishing the first speed and the second speed is aligned with the reaction torque supporting direction for preventing the roll back of the vehicle. As a result, the first and second speed establishing band brake (B-3) can be used as it is to achieve the roll back preventing function without changing the characteristics of the existing brand brake (B-3).

Figure 7:
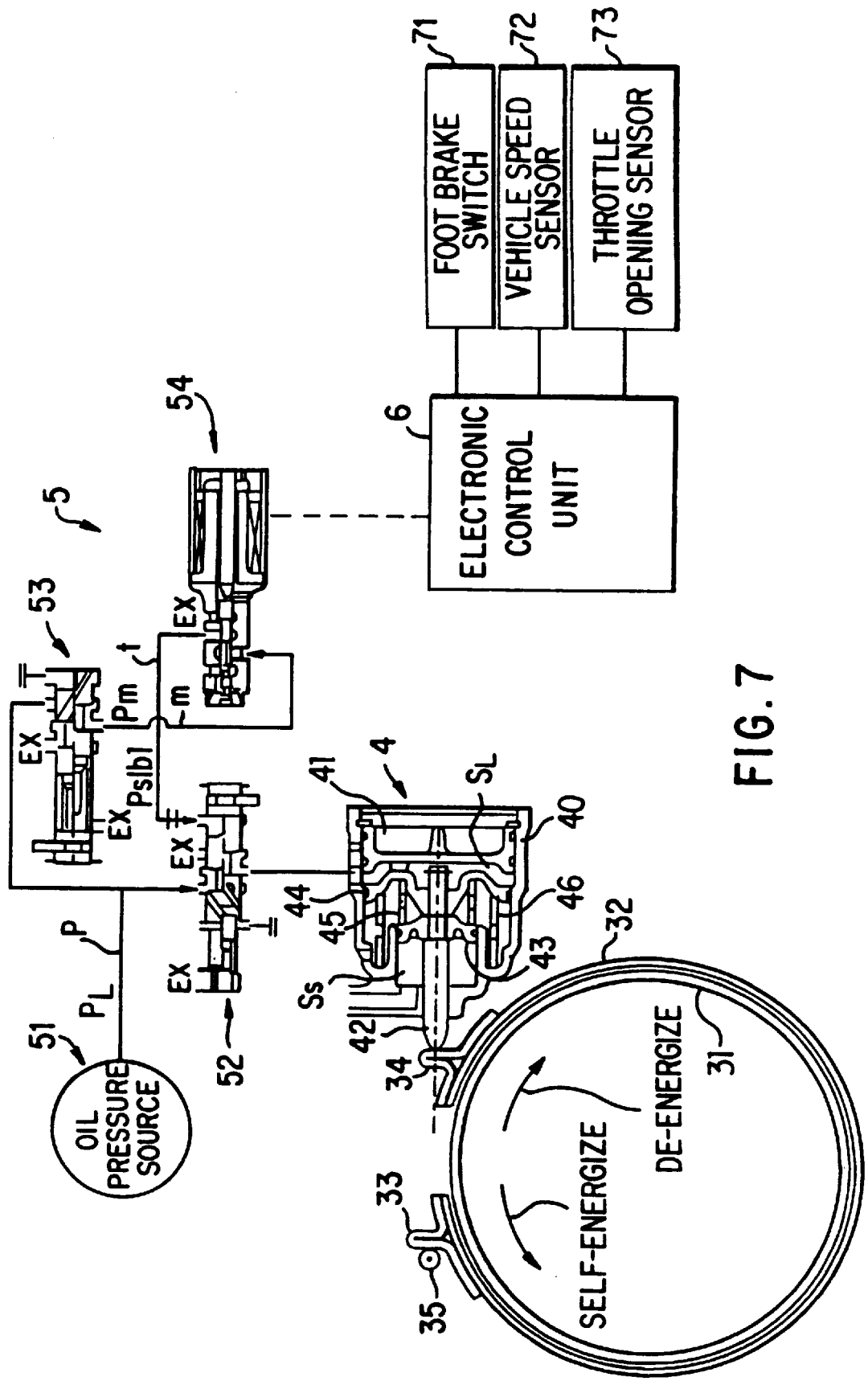
FIG. 7 is a system structure diagram showing the hydraulic circuit and blocks of a control system for a vehicular automatic transmission according to a second embodiment of the invention.
Figures 8, 9:
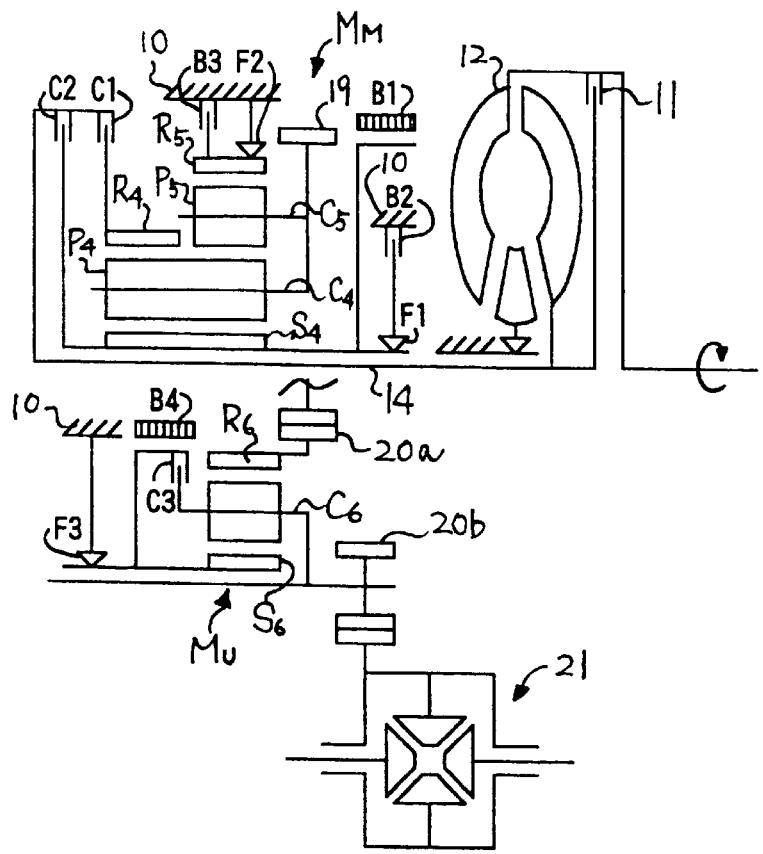
FIG. 8 is a schematic diagram showing a speed change mechanism of the second embodiment.
FIG. 9 is an operation diagram of the automatic transmission of the second embodiment.

Next, FIGS. 7 to 12 show a second embodiment of the invention. First of all, FIG. 8 shows the speed change mechanism of the second embodiment in a schematic diagram. This system also takes the mode of a transfer unit having a gear train of four forward and one reverse speeds for a front-engine/front-drive car, and is structured to include: a torque converter 12 having a lockup clutch 11; a gear train of two-shaft structure having a main speed change unit $M_M$ as the speed change mechanism and a planetary gear unit $M_U$ of underdrive structure; and a differential unit 21.

The main speed change unit $M_M$ of the automatic transmission includes a planetary gear unit of single pinion structure and a planetary gear unit of a double pinion structure, which are combined by integrating a common sun gear $S_4$, the pinion gear of the single pinion side and one pinion gear $P_4$ of the double pinion side, and by connecting a carrier $C_4$ supporting the pinion gear $P_4$ integration and a carrier $C_5$ supporting the other pinion gear $P_5$ of the double pinion side. The sun gear $S_4$, as shared between the two gear units of the main speed change unit $M_M$, can be retained through a band brake B1 and through a second one-way clutch F1 and a brake B2 in series on the transmission case 10. A ring gear $R_4$ at the single pinion side is connected through the clutch C1 to the input shaft 14, which is connected to the turbine output shaft of the torque converter 12, and the sun gear $S_4$ is connected through a clutch C2 to the same input shaft 14. To the counter drive gear 19, there are connected the carrier $C_4$, which supports the pinion gear $P_4$ meshing with the sun gear $S_4$ and the ring gear $R_4$, and the carrier $C_5$, which is connected to the carrier $C_4$ and supports the pinion gear $P_5$ meshing with the pinion gear $P_4$ and a ring gear $R_5$. The ring gear $R_5$ at the double pinion side can be retained on the transmission case 10 by a brake B3 and a first one-way clutch F2 in parallel.

A ring gear $R_6$ of the underdrive planetary gear unit $M_U$ is an input element to be connected to the main speed change unit $M_M$ through counter gears 19 and 20a. A carrier $C_6$ and a sun gear $S_6$ are connected through the clutch C3. Sun gear $S_6$ can be retained on the transmission case 10 through a one-way clutch F3 and a band brake B4 in parallel. The carrier $C_6$ is connected to an output gear 20b connected to the differential unit 21.

In the gear train thus structured, the input, as fed to the ring gear $R_4$ by the application of the clutch C1 of the main speed change unit $M_M$, is outputted as the rotations of the carriers $C_4$ and $C_5$ by supporting the reaction of the ring gear $R_5$ by the lock of the one-way clutch F2, so that the clutch C3 of the underdrive planetary gear unit $M_U$ is released to establish the first speed under the underdrive rotation with the brake B4 being applied, the sun gear $S_6$ being retained, the ring gear $R_6$ inputting and the carrier $C_6$ outputting. At the non-drive time with the carrier $C_6$ being inputted, on the other hand, the first speed is not established because the reaction to act on the ring gear $R_5$ is inverted to set the one-way clutch F2 free. In this gear train, therefore, the brake B3 must be retained so that the first speed may be established at the non-drive time, thus achieving the engine braking effect.

In the aforementioned state, by the retention of the sun gear $S_4$ effecting the lock of the one-way clutch F1 by the application of the brake B2, the input of the ring gear $R_4$ is outputted as the rotations of the carriers $C_4$ and $C_5$ to establish the second speed. In the directly connected state of the underdrive planetary gear unit $M_U$ with the brake B4 being released and the clutch C3 being applied, the third speed is established. In the directly connected state of the main speed change unit $M_M$ with the ring gear $R_4$ and the sun gear $S_4$ being synchronously rotated by the additional application of the clutch C2, the input rotation is outputted unchanged from the carriers $C_4$ and $C_5$ to establish the fourth speed. By applying the clutch C2 and the brake B3, the carrier $C_5$ is rotated backward with the sun gear $S_4$ inputting and the ring gear $R_5$ being retained, to establish the reverse stage. At the aforementioned second and third speeds, at the non-drive time with the carrier $C_6$ inputting, the reaction to act on the sun qear $S_4$ is inverted to set the one-way clutch F1 free so that the second speed and the third speed are not established. Therefore, the brake B1 is applied so that the first speed may be established at the non-drive time, too, to establish the engine braking effect.

The relations between the actions of the individual clutches, brakes and one-way clutches and the individual gear stages to be established by the actions, namely, the first speed (1ST) to the fourth speed (4TH) and the reverse (R) are tabulated in FIG. 9. In FIG. 9, symbols 0 indicate the applied state, and symbols X indicate the released state. At the hill hold time under the neutral control, the clutch C1 is released at the first speed in the D-range, and the brake B1 to be applied at the second speed is applied. As a result, the input from the input clutch C1 to the ring gear $R_4$ is cut. In this state, if the force in the roll back direction of the vehicle occurs, the force is transmitted from the differential unit 21 to the carriers $C_4$ and $C_5$ of the main speed change unit $M_M$ through the under drive planetary gear unit $M_U$, and rotates the carriers $C_4$ and $C_5$ in the retracting direction. By applying the brake B1, however, the sun gear $S_4$ is retained, and the backward reaction torque of the carriers $C_4$ and $C_5$ is supported by the retention of the ring gear $R_5$, as caused by the lock of the one-way clutch F2, so that the backward rotations of the carriers $C_4$ and $C_5$ are not allowed and the roll back of the vehicle is prevented.

Figure 11:
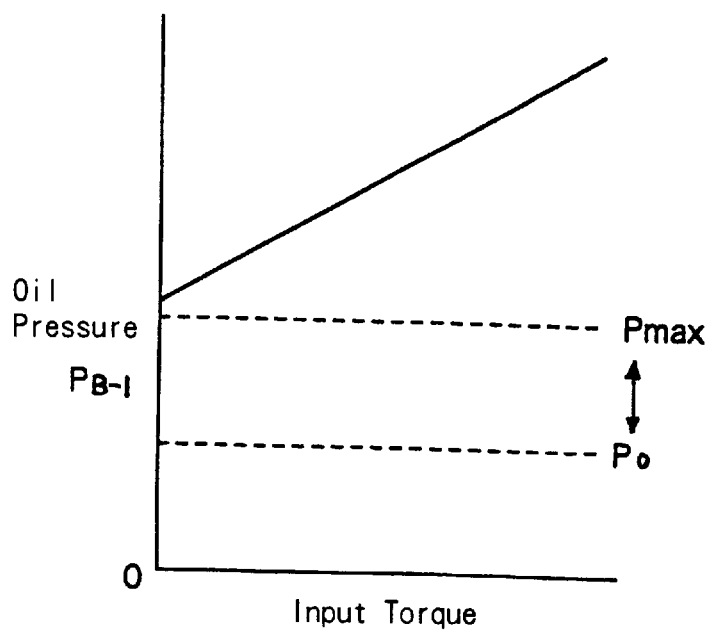
FIG. 11 is a hydraulic characteristic diagram of the hill hold control of the automatic transmission of the second embodiment.

When this hill hold state is to be shifted to the start control, on the other hand, simultaneously with torque transmission to the ring gear $R_4$ started by applying the clutch C1, the brake B1 has to be instantly released to the first speed state. Since the brake B1 applies practically no force to sun gear $S_4$ when sun gear $S_4$ is rotated in the de-energized direction of brake B-1 at servo pressures less than Pmax (as shown in FIG. 11), it can be substantially released without any relief of the servo pressure, to allow the sun gear $S_4$ to rotate idly As a result, the speed change mechanism is brought from the hill hold state to the first speed state without passing through the transient second speed state.

The control system of the speed change mechanism thus structured is shown in FIG. 7. This control system is substantially similar to that of the foregoing first embodiment, but is equipped with a brake switch 74 in place of the snow mode switch because it needs a foot brake signal as the signal for deciding the release of the neutral control. The remaining structure is substantially similar to that of the first embodiment, and its description will be omitted by designating the corresponding components with the same reference characters.

Figure 10:
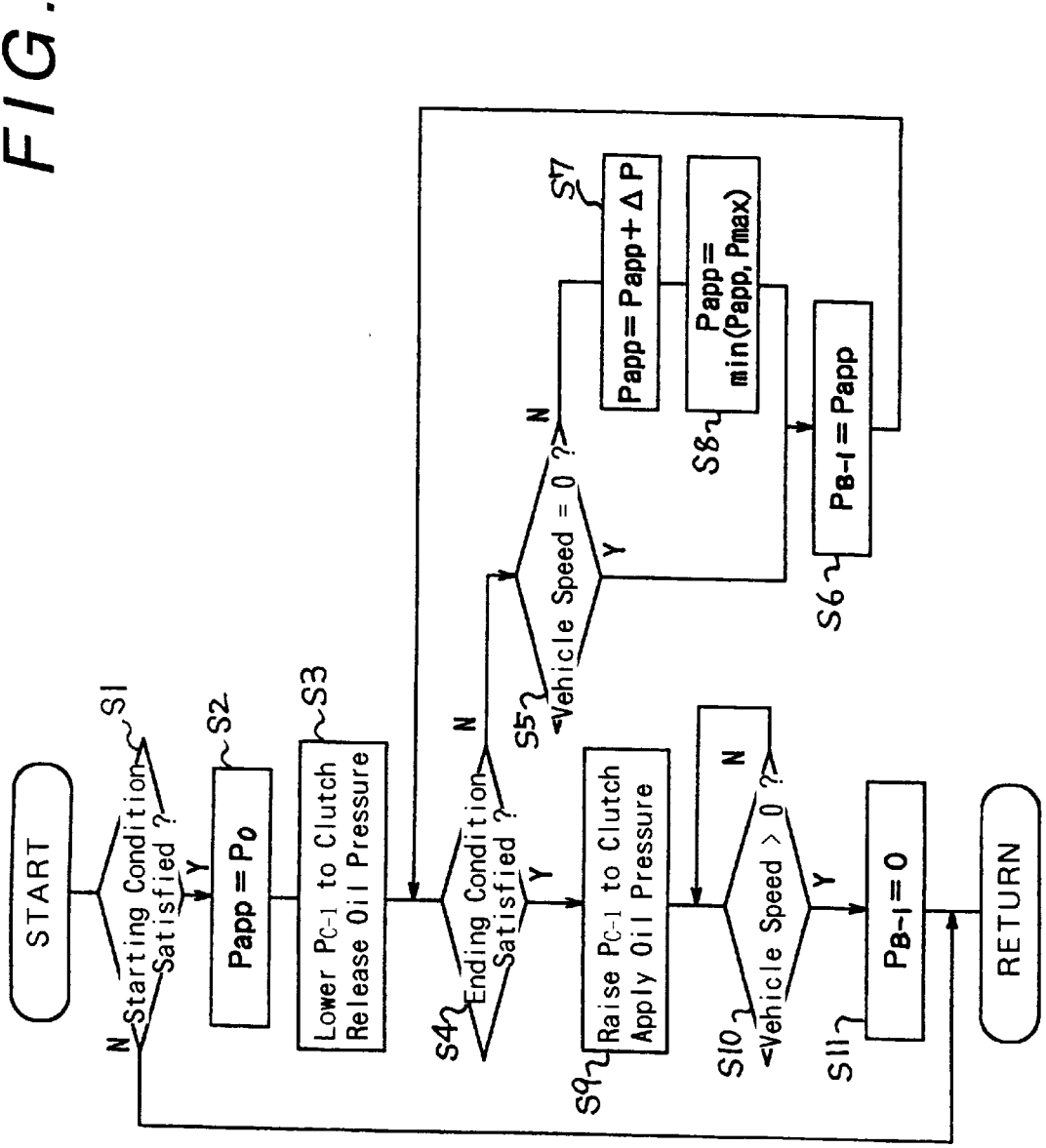
FIG. 10 is a flow chart showing a hill hold control of the control system of the second embodiment.

A flow chart of the hill hold control under this neutral control is shown in FIG. 10. In this flow, before the program start, it is decided at Step S1 whether the starting condition is satisfied. This answer is yes (Y) when all the conditions of the throttle OFF, the vehicle speed V=0 and the brake switch ON are satisfied. When the answer is NO (N) because any of the conditions is not satisfied, the neutral control is not executed.

When the answer of the decision is yes (Y), at Step S2, the apply pressure (Papp) of the brake B1 is set to the level ($P_0$) for preventing the roll back of the vehicle on a road having an ordinary slope. At Step S3, the feed pressure ($P_{C-1}$) to the input clutch C1 is lowered to the clutch releasing level.

The oil pressure ($P_{B-1}$) necessary for keeping the application of the brake B1 is characterized, as illustrated in FIG. 11, to rise linearly with respect to the input torque, whereas the oil pressure necessary for the brake B1 to prevent the roll back of the vehicle takes a constant low level relating not to the input torque but to the torque to be transmitted according to the slope gradient from the wheels to the counter drive gear 19. In this embodiment, too, the oil pressure is set on principle to the level ($P_0$) capable of keeping the lock state of the speed change mechanism on the slope gradient which is ordinarily estimated, and is raised, if necessary, to the limit level (Pmax) lower than the apply oil pressure necessary for the drive time.

Thus, the decision of the vehicle speed=0 at Step S5 is repeated till the ending condition is satisfied (Y) at Step S4. As long as vehicle speed=0 (Y), the feed pressure ($P_{B-1}$) to the brake B1 is continuously fed as the apply pressure (Papp) at Step S6. In other words, the holding of the vehicle V=0 implies that no change is required, because the oil pressure level is at the initially set level ($P_0$) so that the vehicular roll back is sufficiently prevented irrespective of the braking force by the wheel brakes.

In the speed change mechanism in this control state, the brake B1 is applied to retain the sun gear $S_4$, but the one-way clutch F2 is also locked by the backward rotation of the counter drive gear 19 so that the lock state of the mechanism is established in the backward direction. When the answer of the vehicle speed V=0 at Step S5 is no (N), it is assumed that the vehicle is rolling back and that the predetermined level ($P_0$) of the oil pressure is too low. At Step S7, therefore, the apply pressure (Papp) is incremented upwardly by a predetermined value ($\Delta P$). This pressure rise is continued till the answer of the vehicle stop decision is yes (Y), but is so made that the upper limit (Pmax) is not exceeded. The reason why the apply pressure (Papp) is set to the min (Papp, Pmax) is to prevent the oil pressure from exceeding the apply level sufficient for the drive time and from taking the second speed state. This operation is tentatively preparatory, and it is ordinary that the vehicle roll back is sufficiently prevented with the oil pressure level ($P_0$).

Figure 12:
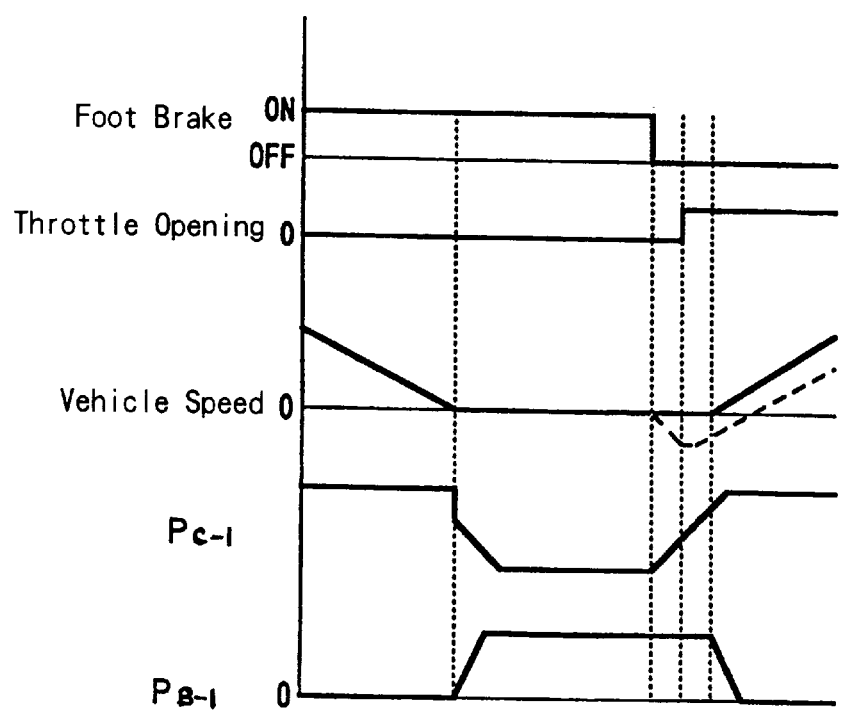
FIG. 12 is a time chart of the hill hold control by the control system of the second embodiment.

As the driver thus enters into the starting operation, the ending condition is satisfied at Step S4. The affirmation (Y) of this ending condition is made by any of the aforementioned conditions of the throttle ON, the vehicle speed being positive (V>0) and the brake switch OFF. At subsequent Step S9, the feed oil pressure ($P_{C-1}$) to the clutch C1 is raised to the clutch apply oil pressure to release the neutral control state, and the routine awaits the affirmation (Y) of the positive vehicle speed at Step S10. When this answer is no (N), it is decided that the vehicle is hill-held by the creep force. When the answer of the positive vehicle speed is yes (Y), at the final Step S11, the feed pressure ($P_{B-1}$) to the brake B1 is lowered to 0, and the control is ended. FIG. 12 shows a time chart of the hill hold control under the neutral control. This chart starts from the braking state to the vehicle stop. At first, the throttle opening is 0, and the foot brake is depressed (ON) so that the vehicle speed is in the decelerating state. When the vehicle speed comes to 0 or to the stop state, both the discharge of the clutch pressure ($P_{C-1}$) to release the clutch C1 for the neutral control and the feed of the apply pressure ($P_{B-1}$) to the hydraulic servo of the brake B1 are started so that the vehicle comes to the roll back preventing state. When the foot brake is released (OFF) for the start, the feed of the clutch pressure ($P_{C-1}$) to the clutch C1 is started. Since the creep force is not established yet at this time, the negative speed implying the roll back of the vehicle occurs, as indicated by a broken curve in FIG. 12. However, this vehicular roll back is prevented by the application of the brake B1 of the present roll back preventing control so that the vehicle speed is kept at 0. When the throttle is opened in this state by depressing the accelerator pedal, the vehicle is started before long so that the vehicle speed begins to rise, as indicated by a solid curve. By releasing the apply pressure to the hydraulic servo of the brake B1 at a proper timing, therefore, the brake B1 is returned to the intrinsic released state to lower the oil pressure to 0.

According to the control system of the second embodiment, as has been described in detail, by applying the oil pressure less than the second level (Pmax) but no less than the first level ($P_0$) to the hydraulic servo 4 to fasten the band brake B1, the roll back of the vehicle is prevented by the self-energe action of the band brake. At the forward run, the action is changed into the de-energe action of the band brake so that the apply force of the band brake B1 becomes too small for retaining the sun gear $S_4$. As a result, the vehicle can be started substantially as if the band brake B1 is released. Even with a delay in the release of the brake, therefore, the vehicular roll back preventing function is released by the forward run of the vehicle so that a smooth start can be achieved without any complicated brake control. Moreover, the roll back preventing function can be achieved by the brake B1 provided in the speed change mechanism for the engine braking, so that the desired purpose can be achieved without adding any special mechanism. At the start from the hill hold state under the neutral control, it is possible to prevent the shift shock which might otherwise be caused by the transient shifting state from the first speed to the second speed due to the release delay of the brake B1. The brake B1, as set to effect the self-energe action in the forward rotation direction so as to retain the forward rotation during a non-driven time of the second speed, is also used to check the backward rotation of the output shaft with self-energe action so that the hill hold can be established without changing the characteristics of the existing band brake.

Although the invention has been described in detail in connection with the two embodiments, it can be practiced by changing the specific structures of the detailed portions in various manners within the scope of the individual claims.

What is claimed is:

1. A control system for a vehicular automatic transmission comprising: a speed change mechanism including an output element connected to a drive shaft of a vehicle to transmit power thereto; a first rotary element connected to said output element; a control system for said speed change mechanism;

a hydraulic servo actuated brake for retaining said first rotary element to check the rotation of said output element corresponding to a vehicle roll back, wherein said brake includes a band brake that establishes different application forces depending on whether the brake operates by a self-energizing action or a de-energizing action according to a rotational direction of said first rotary element, wherein said band brake is set so that said first rotary element rotates during backward rotation of said output element in the direction of the self-energizing action, and is set with a first oil pressure necessary for retaining said first rotary element during backward rotation of said output element caused by the roll back of the vehicle, said first oil pressure being lower than a second oil pressure necessary for retaining said first rotary element during operation of the band brake by de-energizing action, and wherein said control system further comprises oil pressure feeding means for feeding the hydraulic servo of said band brake with an oil pressure which is equal to or greater than said first oil pressure and less than said second oil pressure when, at least, the vehicle stops.

2. The control system for a vehicular automatic transmission according to claim 1, wherein said band brake is a brake that is applied to establish a predetermined gear stage by said speed change mechanism.

3. The control system for a vehicular automatic transmission according to claim 1, further comprising:

high speed stage start selecting means for selecting a start in a high speed stage of said speed change mechanism; and stop detecting means for detecting the stop state of the vehicle, wherein said control system sets the speed change mechanism to a high speed stage when the vehicle is in the stop state, and causes said oil pressure feeding means to feed the hydraulic servo of said band brake with an oil pressure equal to or greater than the first oil pressure and less than the second oil pressure.

4. The control system for a vehicular automatic transmission according to claim 3, wherein said band brake is a brake that is applied to establish a speed reduced stage of said speed change mechanism, and wherein said high speed stage is a directly connected stage having output rpm equal to input rpm.

5. The control system for a vehicular automatic transmission according to claim 2, further comprising:

an input clutch for inputting a drive force from a power source of the vehicle to said speed change mechanism; accelerator operation detecting means for detecting accelerator pedal operation of the vehicle; brake operation detecting means for detecting brake pedal operation; and stop detecting means for detecting a stop state, wherein said control system releases said input clutch when an accelerator pedal is released, when the vehicle is in a vehicle stop state with the accelerator pedal being released, and with a brake pedal being depressed with the vehicle speed being substantially equal to 0; and said control system causes said oil pressure feeding means to feed the hydraulic servo of said band brake with an oil pressure equal to or greater than the first oil pressure and less than the second oil pressure.

6. The control system for a vehicular automatic transmission according to claim 5, wherein said speed change mechanism includes: a second rotary element connected to said output element; a first one-way clutch for checking forward rotation of said second rotary element; and a second one-way clutch for checking forward rotation of said first rotary element, and wherein said band brake is a brake connected to said first rotary element in parallel with said second one-way clutch and associated with retention of backward rotation of said second rotary element by locking action of said first one-way clutch and retention of forward rotation of said first rotary element, for checking backward rotation of the output element of said speed change mechanism, and for retaining said first rotary element during a non-drive time of said speed change mechanism, in which said second one-way clutch rotates idly.

\* \* \* \* \*